Dec. 9, 1952  S. J. OTIS  2,620,568
RULING PEN GAUGE
Filed Aug. 5, 1949  2 SHEETS—SHEET 1
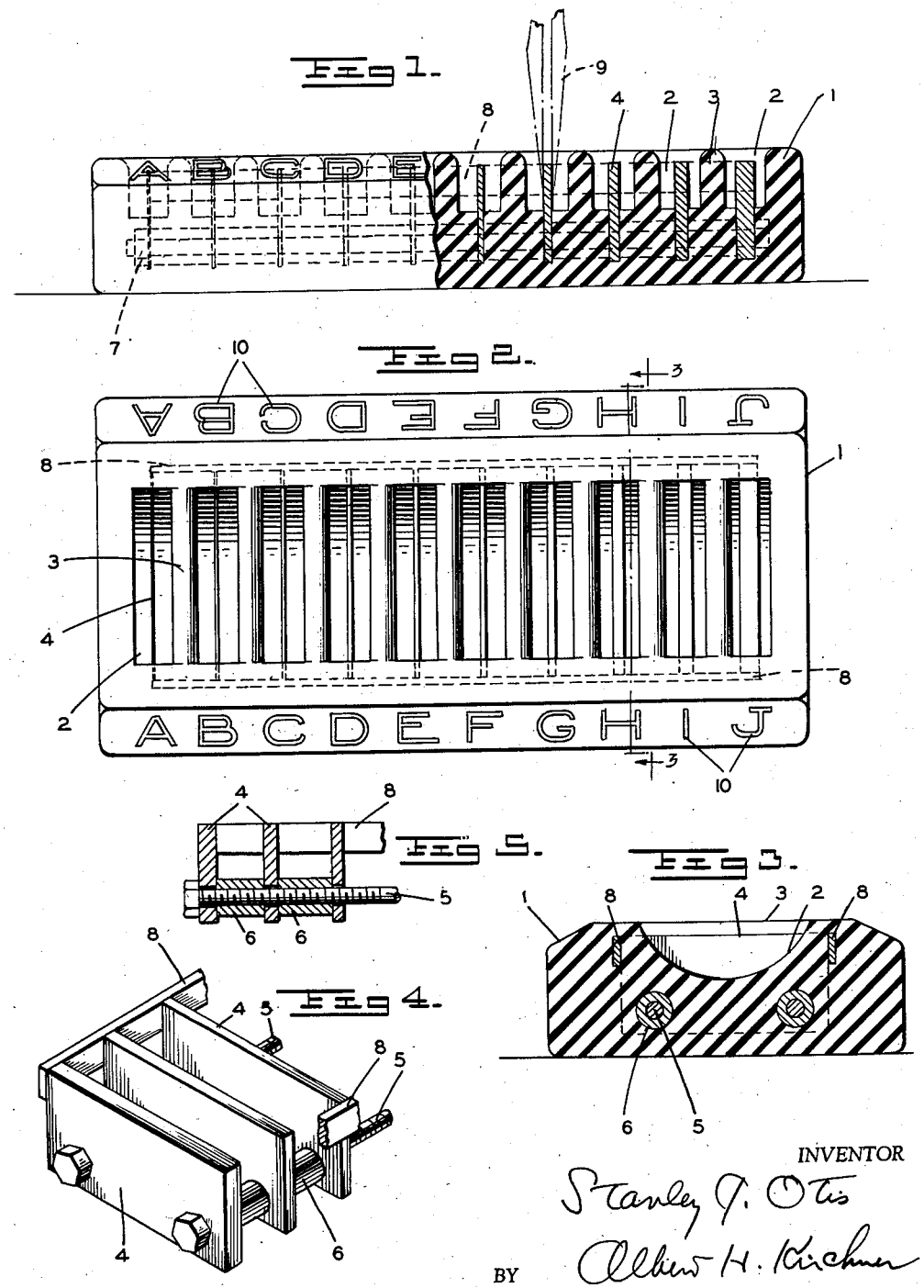
INVENTOR
Stanley J. Otis
BY Albert H. Kirchner
ATTORNEY Dec. 9, 1952  S. J. OTIS  2,620,568
RULING PEN GAUGE
Filed Aug. 5, 1949  2 SHEETS—SHEET 2
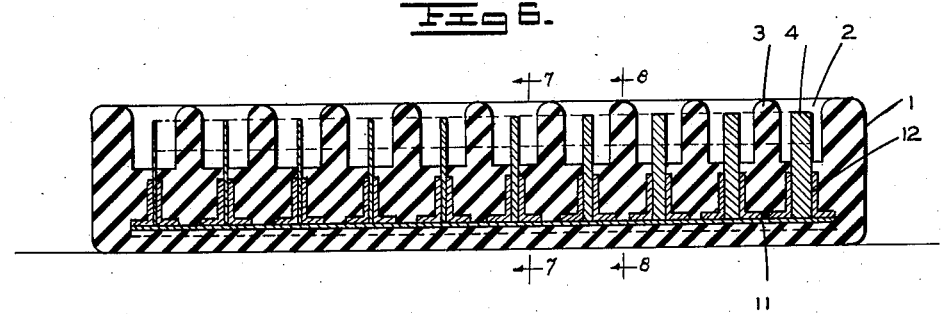
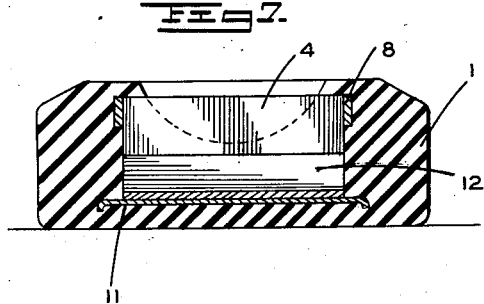
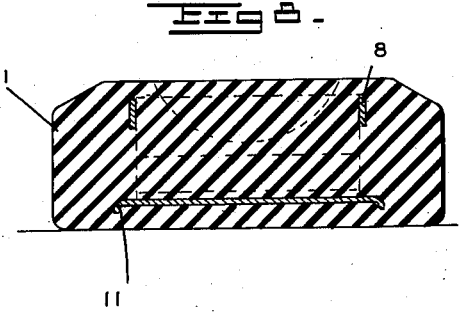
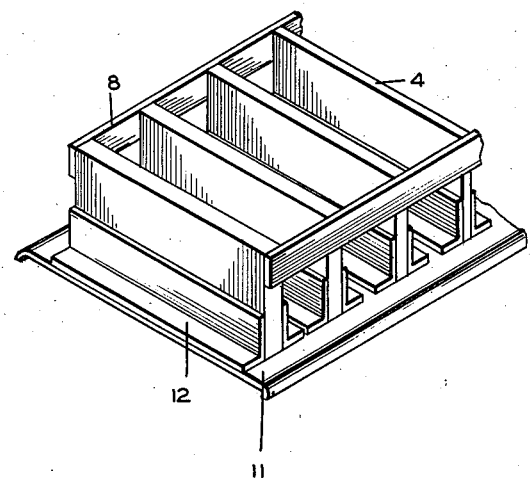
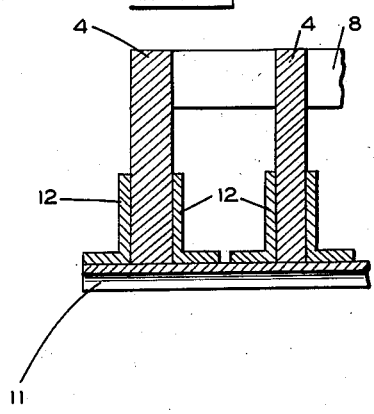
INVENTOR
Stanley J. Otis
BY Albert H. Kirchner
ATTORNEY Patented Dec. 9, 1952

2,620,568

UNITED STATES PATENT OFFICE 2,620,568

RULING PEN GAUGE

Stanley J. Otis, Madison, Wis.

Application August 5, 1949, Serial No. 108,818

6 Claims. (Cl. 33—168)

The present invention relates to ruling pen gauges, and more particularly provides a device for use in rapidly determining the setting of a ruling pen or adjusting such a pen to a predetermined setting.

Draftsmen commonly have occasion to draw lines of different widths or thicknesses which requires frequent change of the adjustment of the ruling pen with which the lines are drawn. It is of course important, in the interest of good drawing, that certain lines be made of accurately uniform width in a given drawing, and that other lines in the same drawing be made of accurately uniform different width. Craftsmen commonly use a single ruling pen to produce all the lines of a drawing, and consequently numerous and frequent adjustments of the nibs of the pen are required to vary the width of the lines to be drawn.

Moreover, it is desirable to establish a scale of standard widths, each designated by its width in fractions of an inch or by some index letter or number, so that draftsmen can be instructed previously to making a drawing to employ certain specified standard widths for the different lines of the drawing. Use of such standards involves of course accurate setting of the drawing pen nibs, and the degree of accuracy necessary for good draftsmanship cannot readily be attained by the usual trial and error method of drawing short test lines and visually comparing them, and of course it is impractical to measure the widths of lines or of the spacing of the nibs by application of a calibrated ruler or the like.

The primary purpose of the present invention is to provide a gauge having a sufficient number of blades or leaves of accurately predetermined different widths to which the nibs of a ruling pen may be applied and quickly adjusted to effect any predetermined spaced setting corresponding to the different thicknesses of the blades.

A related object is to make such a device in convenient, inexpensive and durable form which will be proof against rough usage and will not be apt to be damaged if the device be dropped or otherwise abused.

A related object is to provide a multiple blade gauge of the character indicated in which thickness indicia will be associated with the several blades so that the pen may be adjusted instantly to any predetermined nib setting designated by a standard index character, so that a draftsman using the gauge will be able to reproduce lines of exactly the same width which has been used previously, it being unnecessary to measure the line widths or the pen setting, providing only the index designation of the line be known.

Other and further objects and advantages of the invention will be apparent to those skilled in the art from the drawing and the following description in which certain preferred embodiments of the device are disclosed.

In the drawing,

Figure 1 is a side elevational view, partly broken away to provide a longitudinal sectional view, of one embodiment of the invention.

Fig. 2 is a top plan view of the device shown in Fig. 1;

Fig. 3 is a cross sectional view of the same device, taken on the line 3—3 of Fig. 2.

Fig. 4 is a detail perspective view of a portion of the internal frame of the same device;

Fig. 5 is a detail longitudinal sectional view of the frame;

Fig. 6 is a longitudinal sectional view of a modified embodiment of the invention;

Fig. 7 is a cross sectional view of the form shown in Fig. 6, taken on the line 7—7 of Fig. 6;

Fig. 8 is a cross sectional view taken on the line 8—8 of Fig. 6;

Fig. 9 is a detail perspective view of a portion of the frame used in the device shown in Fig. 6, and Fig. 10 is a detail longitudinal sectional view, on a relatively enlarged scale, corresponding to the view of Fig. 5 but showing the frame used in Fig. 6.

Generally speaking, the invention comprises a plurality of gauge leaves or blades assembled in spaced parallel relation and mounted edgewise in a base block so that each blade is accessible, in an open pocket or recess formed in the block, to the nibs of a ruling pen which can be tried on selected blades or can be adjusted to set the nibs at a spacing equal to the thickness of any of the blades. To this end the invention comprises, in the embodiment shown in Figs. 1-5, a block I preferably made of comparatively resilient or other plastic moulded or otherwise formed with a plurality of open topped pockets or recesses separated from each other by partitions 3, with a gauge blade 4 mounted edgewise in the center plane of each recess, preferably with the top edge of the blade spaced slightly below the plane in which the top edges of the partitions lie, all as best shown in Fig. 1.

The blades which are preferably made of hard, non-corrosive metal, such as stainless steel, can be mounted in a preformed assembly by drilling each blade near its lower corners and passing a long bolt 5 through the aligned holes, with a short sleeve or bushing 6 interposed between each pair of adjacent blades, and then turning a nut 7 (see Fig. 1) up tightly against the last blade of the assembly to clamp the blades and sleeves together as a rigid frame. The blades are of progressively different thickness, but they should be spaced uniformly apart on centers. This can be accomplished by employing sleeves 6 of progressively different lengths, with the shorter sleeves interposed between the blades of greater thickness, i. e., with the sleeves decreasing in length from left to right in Fig. 1, in the direction in which the blades increase in thickness.

I have shown each sleeve 6 internally threaded and screwed on the bolt 5, but it will be understood that smooth bored sleeves can be used if desired, inasmuch as the nut 7 can be relied on to apply adequate clamping force to produce a sufficiently rigid assembly.

The frame may be further stiffened if desired by soldering, spot welding, or otherwise fastening reinforcing strips 8 along the side edges of the assembled blades, near the tops thereof, as best shown in Fig. 4.

The assembly thus produced is mounted in the base block 1 in any convenient way, preferably by mounting the same in a mold in which the block is cast. In any event, the block is formed with recesses 2, one for each blade, in which the blades are centered, with ample space between each blade and the adjacent partitions 3 for admitting the two nibs 9 of a ruling pen in straddling relation to the blade, as shown in Fig. 1.

A useful feature of the invention consists in making the floor or bottom of each of the recesses 2 curved more or less cylindrically as shown in Fig. 3, to facilitate brushing out of the recess any dirt particles, eraser crumbs or the like that may become lodged therein.

There may be associated with each of the blades an index character designating its thickness in terms of fractions of an inch, millimeters or other units, or arbitrarily lettering or numbering the blade in accordance with some predetermined standard. Such indicia are shown at 10 in Fig. 2, where they are displayed on the opposite lengthwise beveled side margins of the block 1.

In the modified embodiment of the invention shown in Figs. 6-10, the frame which mounts the blades includes a bottom plate 11, conveniently made of sheet metal, to the upper surface of which a plurality of short angles 12 are soldered, spot welded or otherwise permanently secured crosswise in spaced parallel relation to provide upstanding slots between pairs of adjacent angles. The blades 4 are set in these slots and permanently secured therein by welding, soldering or the like. Reinforcing side strips 8 may be secured to the upper side edges of the assembled blades, as in the first described embodiment. It is convenient to make the angles 12 all of the same stock, with their bottom flanges hence all of the same width, in which case uniform separation of the centers of the blades is obtained by spacing the pairs of angles progressively farther apart on the plate 11 as the thickness of the blades decreases, as from right to left in Fig. 6. Thus all the mounted blades are spaced uniformly apart on centers, and each is located at the middle line of the recess in the base block which is molded about the assembly.

The construction of the Fig. 6-10 embodiment is otherwise similar to that of Figs. 1-5, and its uses and advantages are the same.

The manner in which the invention is used is believed to be clear from the foregoing explanation. If the width of a line to be drawn is known, either in terms of its actual measurement or in terms of the index by which that measurement is designated, a pen is applied to the appropriate blade by adjusting its nibs in straddling relation to the blade, as shown in Fig. 1. When the adjustment is such that the nibs are spaced apart a distance equal to the blade thickness a line can be drawn exactly equal to that thickness. Other adjustments can be made instantly by applying the pen nibs to other blades, and the nibs can be restored to their original or any other adjustment by applying them at any time to the appropriate blade.

Of course the blade thicknesses can be made according to any desired scale, but I have found, and hence suggest, that the following scale is very useful as covering the whole range in which lines can be drawn to make practically any desired mechanical drawing:

| Index Letter | Blade Thickness in Inches |
|---|---|
| A | 0.002 |
| B | 0.004 |
| C | 0.006 |
| D | 0.010 |
| E | 0.015 |
| F | 0.020 |
| G | 0.030 |
| H | 0.045 |
| I | 0.065 |
| J | 0.085 |

The device is small, compact and neat in appearance. While the blades, particularly the thinner ones, are fairly delicate, they are well protected by the surrounding material of the base, so that no damage to the blades can result from normal use or even rough handling, including accidental dropping of the device.

The structure is capable of further modification within the spirit of the invention as pointed out by the appended claims.

I claim:

1. A ruling pen gauge comprising a block having a plurality of spaced parallel recesses in its upper surface, in combination with a plurality of blades of varying thickness, one blade being permanently fixed edgewise in each recess with the sides of each blade spaced from the side walls of its recess so that a ruling pen can be inserted into each recess with the spaced nibs of the pen straddling the blade in the recess to determine the spacing of the nibs.

2. A ruling pen gauge comprising a block of resilient material having a plurality of spaced parallel recesses in its upper surface, in combination with a plurality of blades of varying thickness, one blade being permanently fixed edgewise in each recess with its upper edge below the upper surface of the block so that the blade is protected by the resilient material of the block and with the sides of the blade spaced from the side walls of its recess so that a ruling pen can be inserted into each recess with the spaced nibs of the pen straddling the blade in the recess to determine the spacing of the nibs.

3. A ruling pen gauge comprising a block having a plurality of spaced parallel recesses in its upper surface, in combination with a plurality of blades of varying thickness, one blade being permanently fixed edgewise in each recess with its upper edge below the plane of the upper surface of the block and with the sides of the blade spaced from the side walls of the recess so that a ruling pen can be inserted into each recess with the spaced nibs of the pen straddling the blade in the recess to determine the spacing of the nibs, and indicia displayed on the block juxtaposed to the blades to indicate their thickness.

4. A ruling pen gauge comprising a rigid fixed unitary frame including a plurality of spaced blades of varying thickness and a block in which the frame is embedded with the upper edge of each blade below the plane of the upper surface of the block and with each blade exposed in a recess formed in said upper surface and with the sides of each blade spaced from the side walls of its recess so that a ruling pen can be inserted into each recess with the spaced nibs of the pen straddling the blade in the recess to determine the spacing of the nibs.

5. A ruling pen gauge comprising a rigid fixed unitary frame including a plurality of spaced blades of progressively varying thickness and a block in which the frame is embedded with each blade exposed in a recess formed in the upper surface of the block with the upper edge of each blade below the plane of the upper surface of the block and with the sides of the blade spaced from the side walls of the recess so that a ruling pen can be inserted into each recess with the spaced nibs of the pen straddling the blade in the recess to determine the spacing of the nibs.

6. A ruling pen gauge comprising a block having a plurality of spaced parallel recesses in its upper surface, in combination with a plurality of blades of varying thickness, one blade being permanently fixed edgewise in each recess with the upper edge of the blade disposed below the plane of the upper surface of the block and with the sides of the blade spaced from the side walls of its recess so that a ruling pen can be inserted into each recess with the spaced nibs of the pen straddling the blade in the recess to determine the spacing of the nibs.

STANLEY J. OTIS.

REFERENCES CITED

The following references are of record in the file of this patent:

UNITED STATES PATENTS

| Number | Name | Date |
|---|---|---|
| 845,899 | Roehm | Mar. 5, 1907 |
| 885,838 | Coats | Apr. 28, 1908 |
| 1,524,474 | Buck | Jan. 27, 1925 |
| 1,837,556 | Le Blond | Dec. 22, 1931 |
| 1,881,651 | Judge | Oct. 11, 1932 |
| 2,493,233 | Dower | Jan. 3, 1950 |

FOREIGN PATENTS

| Number | Country | Date |
|---|---|---|
| 150,151 | Great Britain | Sept. 2, 1920 |

OTHER REFERENCES

Publ.: Johansson Catalogue No. 17, page 22, August 9, 1945.